Nov. 25, 1924. Re. 15,953

E. E. BECK

CUT-BACK DIE THREAD MACHINE

Original Filed Dec. 1, 1911 2 Sheets-Sheet 1

Inventor
Edward E. Beck.
By J. Bruce King
Attorney.

Nov. 25, 1924.

Re. 15,953

E. E. BECK

CUT-BACK DIE THREAD MACHINE

Original Filed Dec. 1, 1911 2 Sheets-Sheet 2

Inventor:
Edward E. Beck
By J. Murcutina
Attorney

Reissued Nov. 25, 1924. Re. 15,953

UNITED STATES PATENT OFFICE.

EDWARD E. BECK, OF CHICAGO, ILLINOIS, ASSIGNOR TO CROWN DIE & TOOL COMPANY, OF CHICAGO, ILLINOIS, A CORPORATION OF ILLINOIS.

CUT-BACK-DIE-THREAD MACHINE.

Original No. 1,058,711, dated April 15, 1913, Serial No. 663,348, filed December 1, 1911. Application for reissue filed November 5, 1923. Serial No. 673,020.

*To all whom it may concern:*

Be it known that I, EDWARD E. BECK, a citizen of the United States, and resident of Chicago, in the county of Cook and State of Illinois, have invented certain new and useful Improvements in Cut-Back-Die-Thread Machines, of which the following is a full, clear, and exact specification.

This invention relates to improvements in die thread cut-back machines, that is to say, milling or cutting back die teeth in order that when in operation they may freely discharge their cuttings, an operation which is not only objectionably expensive, but obviously inaccurate as compared with that possible and practical by means of a machine uniformly as must be cutting back the tooth in a die.

The object of my invention, broadly stated, is a construction and arrangement of devices which may be mounted upon the bed plate of an ordinary and commonly used drill press which will serve to hold and present to a mechanically revolved cutter a die, the teeth of which must be milled or cut back prior to its use and in such a manner as to insure a rapid and uniform cutting back of the teeth in every operating cutter tooth of such a die.

More specifically stated, the object of my invention is a device in which the teeth of a cutting die may be used as a means for securing the die in its operative position relative to a milling cutter, revolved about a fixed axis, and in such a manner that the several cutters of the die may be shifted to operative engagement alternately with a revolving cutter, and locked against possible accidental movement during the milling of the die teeth.

A further object of my invention is a die thread cut-back machine, simple, cheap and durable in construction, convenient of access and operation, and within the perfect control of a single operator, and to and from which the dies may be secured and removed.

With these ends in view, my invention finds embodiment in certain features of novelty in the construction, combination and arrangement of parts by which the said objects and certain other objects are hereinafter attained, all as fully described with reference to the accompanying drawings, and more particularly pointed out in the claims.

In said drawing.

Similar characters of reference indicate the same parts in the several figures of the drawing.

Figure 1:
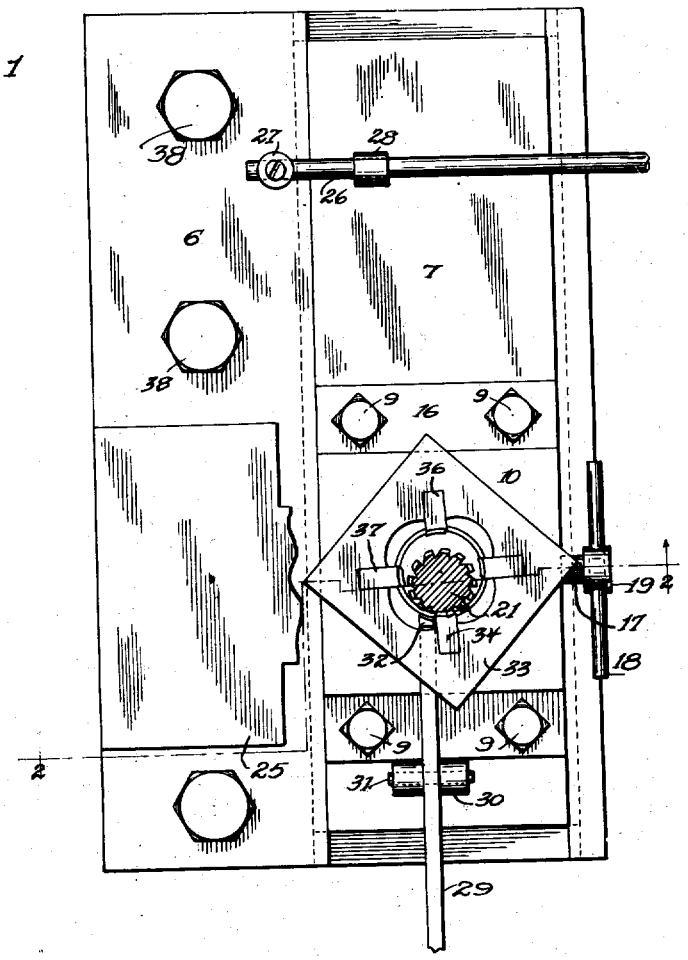
Figure 1 illustrates in top plan view a die thread cut-back machine in which my invention finds embodiment, with the revolving cutter or milling device shown in cross section.

5 indicates the bed plate of a drill press upon which is mounted and secured in any suitable manner a base plate 6 in a suitable recess in which is a sliding block 7 receiving the screw threaded ends 8, 8 of bolts 9, 9 projected through a head block 10. The head block 10 is provided with a central opening into and through which is screwed the shank 11 of a screw threaded die holder 12, the head block being supported upon a rod 13 seated and free to turn in a circular groove 14, extending longitudinally of the sliding block 7, the head block 10 being also provided with a circular groove 15 in which the rod 13 seats.

The head block 10 is cut away at its opposite ends 16 as shown in full lines in Fig. 1, and indicated by a dotted line in Figure 2, for seating the heads of the bolts in a plane below the upper surface of the head block and for convenience of manipulation, for adjusting the head block, but the resting of the head block as it does upon the rod 13, not only substantially relieves the bolts 9 from the weight of the head block, but provides for conveniently and easily tipping the head block when adjusting it to the desired plane by means of the screw bolts, 9—9.

The shank 11, by means of its screw threaded end is adjustable toward and from the sliding block 7 so that by screwing the die holder down or up in the head block, it may be raised and lowered with reference to the milling cutter, that is to say vertically adjusted, the shank 11 being locked in its adjusted position by means of a screw bolt 17 actuated by a rod 18 passing through a head 19 at its outer end, the inner end of the screw 17 having a bearing laterally against the shank 11.

The holder 12 is more or less cone shaped and provided with screw threads 20 and thereby adapted to be engaged by the teeth of the die cutters or a sufficient number of said teeth so when the cutting die is turned thereon it will be held in its operative position below a milling cutter 21, the upper end of the shank 22 of which is screwed into the head 23 of a rotating shaft of a drill press only a part of which is shown in the drawing, a bracket 24 projecting from the standard 25 serving to guide and steady the rotating shaft.

In order to shift the several cutters of the die plate to cutting engagement with the milling cutter 21 (see Fig. 1) a lever 26 is pivoted to the base plate 6 by means of a screw 27 which lever projects through a swivel 28 on the sliding block 7, and projects forwardly in reach of the operator, the die plate being locked by means of a locking lever 29, pivoted to a lug 30 on the end 16 of the head block 10.

Figure 2:
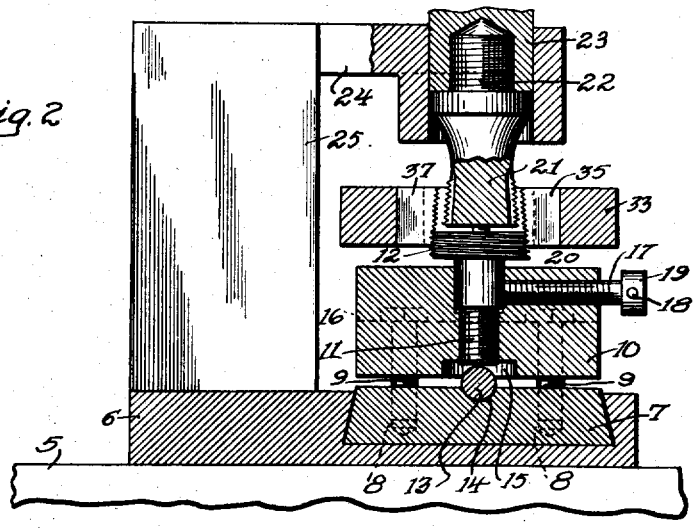
Figure 2 is a transverse section on the irregular line 2—2 of Fig. 1.

The inner portion of the locking lever 29 works in a depression or slot in the head block 10, and at its extreme inner end is provided with an upwardly projecting lug 32, which when elevated to its locking position engages the adjacent side wall of the cutter of the die being operated upon by the press die cutter, 21, as clearly shown in Figure 1, and from which engagement with it the lug 32 is released by lifting the outer end of the lever 29, and by releasing the die holder from its engagement with the screw bolt 17 and then taking hold of the die plate and turning it to a position engaging the locking lug 32, which in the meantime has been elevated to its operative position. In other words, with the die plate 33 screwed to its operative position on the die plate holder 12, as shown in Figure 1, the lug 32 is lifted to engagement with the cutter 34, the die holder being then locked by screwing up the bolt 17 to engagement with its shank, and then following the completion of the cutting back of the teeth in cutter 34, the screw bolt is loosened, the lug 32 depressed, and the die turned until the cutter 35 is swung to engagement with the lug 32, which in the meantime has been elevated for that purpose, and whereupon the screw bolt 17 is again tightened and so on with the cutters 36 and 37 of the die plate.

In operation the die plate is first screwed quite tight upon the holder 12, when the outer end of the lever 29 is depressed until a die cutter engages the lug 32, whereupon the die plate is locked against turning by the screw 17, and the cutter then moved to operative engagement with the die press cutter 21 by the operator shifting the sliding block 7 through the medium of the lever 26, and by means of which he has under perfect control the cutting force of the milling cutter.

The lever 29 with its lug 32, not only operates as a stop limiting the die cutter to be operated upon, but also as a gage fixing the point at which the cutters must be held for cutting back the teeth of the die plate at the point they should and must be, and along the proper curve or angle without injuring the cutting end or edge of the teeth, for it will be observed that in practically all cutting dies, the cutters for obtaining the best effect in operation, and especially when there are four, are arranged on lines radial to the axis of the die and at right angle to the adjacent cutter.

It should now be observed that but one cutter of the die can at any time be brought to contact with the milling cutter 21, and that the position of the cutter when operating upon a die chaser is such that the milling cutter is tangential to the circle of the base of the die teeth and on a line outwardly beyond the die cutter. In other words the cutting action of the milling cutter into the chaser is on a curved line which is tangential to the curvature of the die teeth, and the teeth of the milling cutter therefore cut back without cutting into or substantially cutting into the curved base between the cutting points of the die teeth, that is to say, the shanks of the chaser teeth are cut back without cutting into the cutting point of their teeth.

Figure 3:
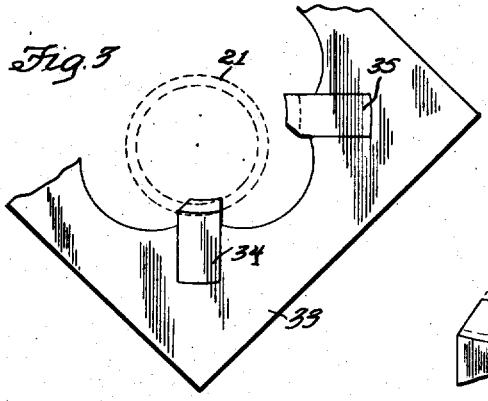
Figure 3 is an enlarged detail plan view of the die to be cut, with dotted lines showing the adjustment of the revolving cut-back device in its operative position against one of the cutters and away from another cutter of the cutting die, and—
Figure 4:
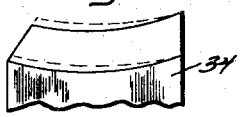
Figure 4 is an enlarged detail plan view illustrating the operative position of the revolving cutter with reference to a cutting die tooth when milling or cutting such tooth back.

The enlarged plan view in Figure 3 illustrates in plan view the relative position of the milling cutter to the teeth of the chaser 34 while being cut back, while the enlarged detail in Figure 4 shows a plan view of one of the teeth after it is cut back, with dotted lines showing the positions of the curved base of the tooth before it is cut back by the chaser cutter. When the teeth of the cutting die in contact with the milling cutter have been sufficiently cut back, the remaining uncut teeth which have been used for securing the cutting die to the holder and therefore not cut back, are planed down or cut off.

In conclusion it should be observed that the embodiment of my invention is not limited by the details of construction shown, as for example the means by which the die cutter is shifted and locked in its several operative positions, for obviously other means might be employed serving the same purpose, which as such might be mechanically substantially different from those herein described and in some instances it might be possible and practical to have the die cutter held in a fixed position and to shift the chaser cutter to the several positions necessary for cutting back the teeth of the die.

It will also be observed that I secure the holding of the die in position and the necessary accurate alignment thereof by utilizing the extreme lower portions only of the threaded chasers for securing the die to the holder and to serve as gage points, leaving the upper portions of the threaded chasers free and clear for engagement by the cutter to cut back the threads. I, therefore disclaim any mechanism which requires means for securing the necessary alignment of the die by any connection with the exterior surface or periphery thereof or for holding the die in position to be operated upon by any other means than engagement between the threaded holder and a few threads at the extreme lower end portions of the chasers of the die, which few threads, as heretofore explained, are afterwards planed down or cut off, this manner of securing the die to the holder leaving the upper end portions of the threaded chasers free and clear for the action of the cutter. By utilizing the bore of the die for securing the die 33 to the holder 12 and arranging the holder 12 and the cutter 21 functionally end to end, I am able to place both the holder 12 and the cutter 21 within the bore of the die 33, so that each element performs its function independently of and without disturbing the other, leaving ample room for clearance of cuttings and adjustment of the several cutters of the die successively to the milling cutter and disregarding entirely the contour of the outer surface of the die for any purpose connected with the cut-back operation.

Having described my invention what I claim and desire to secure by Letters Patent is:

1. A die thread cut-back machine comprising in combination a milling cutter, a die support in a plane below said cutter, an adjustable rocking head block for the support, and means whereby said support and head block may be adjusted with reference to the milling cutter and the head block and support may be rocked in adjusting them to the cutter, substantially as described.

2. A die thread cut-back machine comprising in combination a die support, a rocking head block in which said support is adjusted, a sliding block supporting said head block, a rotatable milling cutter wholly above the holder, and means for adjusting the head block substantially as described.

3. A die thread cut-back machine comprising in combination a base plate, a sliding block mounted thereon, a head block supported above, and means for adjusting and rocking said head block, a die support rotatable in the head block, and means for locking said support against turning, substantially as described.

4. A die thread cut-back machine comprising in combination a sliding block, a head block, a die support screw threaded in and projecting through said head block, a rod interposed between the sliding block and the cutting die support upon which the head block may be oscillated, and means at opposite sides of said rod by which the cutting die support is both vertically and laterally rocked and vertically adjusted, substantially as described.

5. A die thread cut-back machine comprising in combination a base plate, means for securing said plate to the bed plate of a milling cutter, a sliding block seated in the base plate, a head block and an adjustable die support, the shank of which projects through said head block, means for adjustably rocking said support, and means for locking said support and the head block against movement with reference to the sliding block when adjusted, substantially as described.

6. A die thread cut-back machine comprising in combination a die, means for tightening said die on its support, means for rotating said support, a pivoted lever provided with a lug adapted to engage the die and limit the rotation of the support, means for locking said support against rotation, and means for laterally rocking and adjusting the support, substantially as described.

7. A die thread cut-back machine comprising in combination a sliding block, a head block supported above, and adjustable with reference thereto, a die support, the shank of which projects through the head block, a roller interposed between the support and the sliding block, said support being provided with threads adapted to mesh with the threads of the die and tighten the same thereon, a milling cutter revolving upon a fixed axis and means for adjusting the teeth of the die to contact with the milling cutter for cutting back the teeth of the die, substantially as described.

8. A die thread cut-back machine comprising in combination a threaded holder engaging the threads of a die at the extreme lower ends only of the chasers, a milling cutter above said holder and adapted to cut back the threads of said chasers extending above said holder, means for actuating said cutter and means for adjusting each chaser of the die to the milling cutter.

9. A die thread cut-back machine comprising in combination a threaded holder engaging the lower threads only of the chasers of a die, leaving the threads of said chasers above said holder free and clear for the cut-back action of said cutter, a rotatable milling cutter above said holder within the bore of the die, and means for locking the die against rotation during the milling operation.

10. A die thread cut-back machine comprising in combination a threaded die holder adapted to engage with the threads at the extreme lower ends only of the chasers of a die, leaving the upper threaded portion of the chasers free and clear, a milling cutter mounted above said threaded holder and revolving upon a fixed axis and adapted to engage the threads of said chasers extending above said holder, and means for adjusting the teeth of each die chaser in contact with the milling cutter for cutting back the teeth of the die.

11. A die thread cut-back machine comprising in combination a threaded die holder, a die having threaded chasers engaging said holder at the extreme lower ends only, leaving the threads at the upper end portions of said chasers free and clear, a rotatable milling cutter within the bore of the die and adapted to engage the threads of said chasers extending above said die holder, a lever provided with a lug to engage the die and prevent its rotation during the milling operation, means for locking said die holder against rotation during the milling operation, and means for adjusting the die holder to bring each successive chaser on the die into contact with the milling cutter.

12. A die thread cut-back machine comprising in combination a threaded die holder, a die having threaded chasers engaging said holder at the extreme lower ends only, leaving the threads at the upper end portions of said chasers free and clear, a rotating milling cutter within the bore of the die and adapted to engage the threads of said chasers extending above said die holder, a pivoted lever provided with a lug to lock the die against rotation during the milling operation, means for locking the die holder against rotation while the die is being placed thereon and while being removed, and means for adjusting the die holder to bring the chasers of the die thereon into operative relation with the milling cutter.

In testimony whereof, I have signed this specification.

EDWARD E. BECK.